C. H. BAKER.
FRUIT PICKER.
APPLICATION FILED JUNE 16, 1911.
1,023,709.
Patented Apr. 16, 1912.
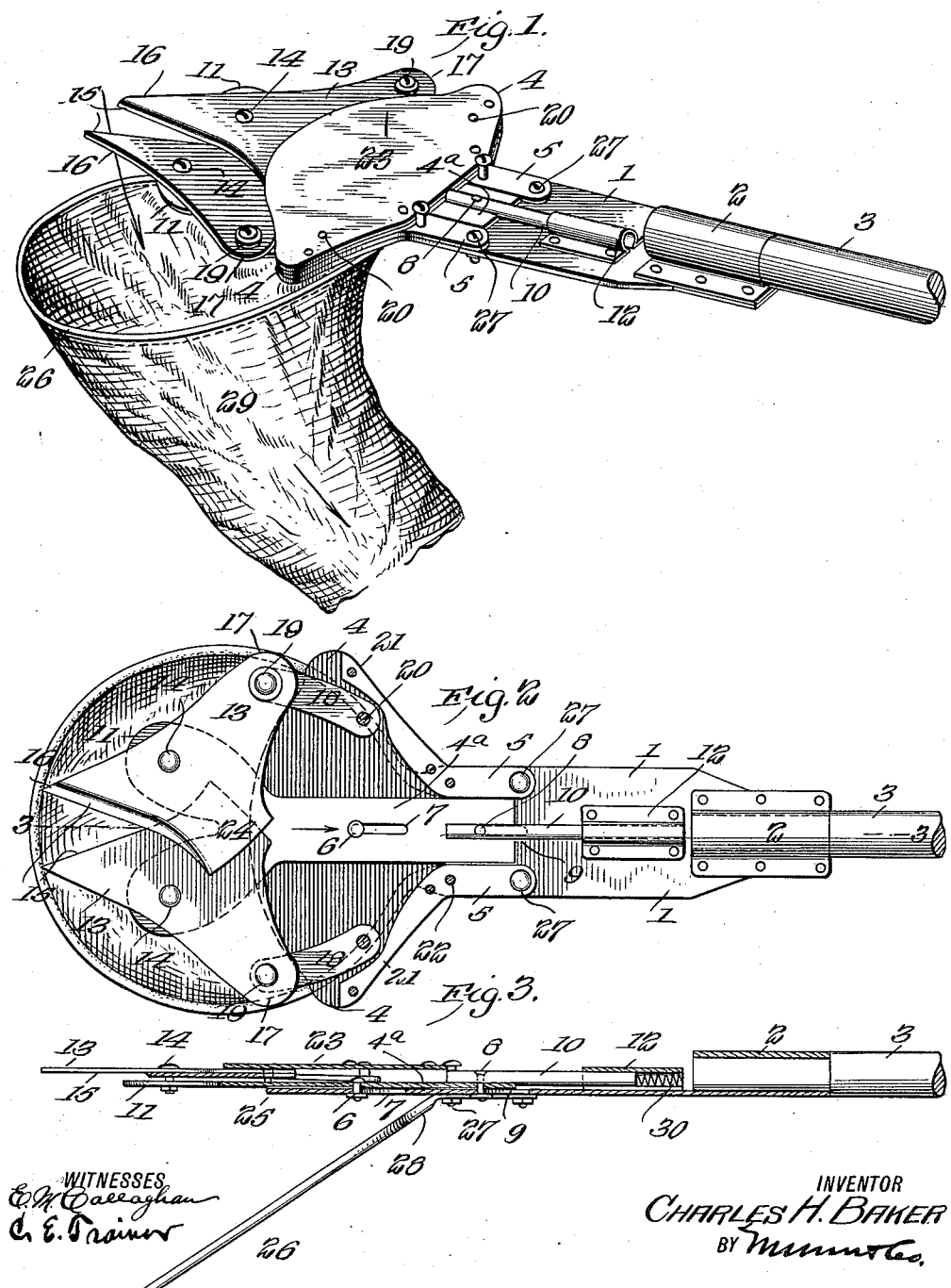
WITNESSES
INVENTOR
CHARLES H. BAKER
BY
ATTORNEYS ary form.

UNITED STATES PATENT OFFICE.

CHARLES H. BAKER, OF CEDARVILLE, CALIFORNIA.

FRUIT-PICKER.

1,023,709.	Specification of Letters Patent.	Patented Apr. 16, 1912.

Application filed June 16, 1911. Serial No. 633,459.

*To all whom it may concern:*

Be it known that I, CHARLES H. BAKER, a citizen of the United States, and a resident of Cedarville, in the county of Modoc, State of California, have invented a new and useful Improvement in Fruit-Pickers, of which the following is a specification.

My invention is an improvement in fruit pickers, and has for its object the provision of a simple, light weight device of the character specified for permitting the operator on the ground to cut the fruit from the twig and convey it into a receptacle without any liability of bruising the same, and wherein the cutting blades are arranged to be operated by the contact therewith of the twig itself.

In the drawings: Figure 1 is a perspective view of the device; Fig. 2 is a plan view with the top plate removed; and Fig. 3 is a section on the line 3—3 of Fig. 2.

The present embodiment of the invention comprises a plate 1 provided at one end with a socket 2 for receiving one end of a pole 3, and provided at the other end with oppositely arranged lateral ears 4. A bar 4$^a$ is slidable longitudinally of the plate between a pair of guide bars 5, and the bar is guided and limited in its movement by a pin 6 on the plate which engages a longitudinal slot 7 in the bar. The bar is also guided and limited by a pin 8 moving in a slot 9 in the bar and connecting the outer end of a rod 10 and the plate 1. The opposite end of the rod is received in a socket 12 on the plate in alinement with the socket 2. The outer end of the bar is provided with diverging ears 11 which extend beyond the outer end of the plate 1. A blade 13 is pivoted to each ear by a bolt 14. Each blade is substantially triangular in shape, each side edge being slightly concave. One of the said edges 15 is formed into a cutting edge, and the blades are oppositely arranged with the cutting edges inward and with the said edges crossing each other at their inner ends. The outermost corner 16 of each blade is pointed as shown, and the blades are normally held with the points 16 spaced apart, so that the twig may enter between the cutting edges. The corner 17 of each blade adjacent to the ear 4 of the plate 1 is connected to the said ear by a link 18. The link 18 is pivoted at one end to the blade by a bolt 19 and is pivoted to the ear 4 at the other by means of a bolt 20 which passes through the link end and the plate 1.

Each of the guide bars 5 is provided with an outwardly inclined portion 21 which extends along the adjacent side of the plate 1, and the bar is secured to the plate by rivets 22. A cover plate 23 is arranged above the bar 4 and the links 18, and above the inner sides of the blades, and is held in place by the rivets 22.

The heels 24 of the blades overlap, and the bar 4 is longitudinally recessed at 25 between the ears 11 so that the twig cannot engage the said bar, and a hoop or split ring 26 is secured to the plate 1 by means of bolts 27, which pass through the guide bars 5, plate 1, and the ends 28 of the ring or loop. A chute 29 of fabric material has one of its ends connected to the hoop, and the other end may be closed to form a receptacle or may lead to a receptacle on the ground. The chute is inclined as shown, so that the fruit will not fall directly onto the fruit in the receptacle, but will roll down the chute walls.

In operation, the pole 3 is of such length that the operator may stand on the ground and reach the fruit with the device. The blades 13 are approached to the twig holding the fruit to be picked, and in such position that the twig will enter the passage or recess 25 and between the cutting edges of the blades. As the twig engages the said edges of the blades the heels 24 of the blades will be pressed rearwardly and laterally, thus causing the points 16 to approach each other and the cutting edges will cut the twig with a shearing cut like the action of a pair of scissors. The fruit will fall into the chute and will strike the side walls thereof and will move down into the receptacle without engaging any hard substance to bruise the said fruit. The bar 4 moves longitudinally toward the pole 3 with the blades, and the parts are returned to their original position by a spring 30 arranged in the socket 12 between the end of the rod 10 and the end of the pole 3.

The chute or conduit 29 in practice is closed at its lower end by the hand of the operator until the fruit strikes the hand, when it may be removed and placed in a suitable receptacle.

With the hoop and chute removed, the device is adapted for pruning purposes.

The pole 3 is preferably made in separable sections.

It will be evident that the actual operation of severing the twig is entirely automatic, the blades being actuated and caused to cut by the engagement of the twig therewith. Thus the device can be handled with one hand, leaving the other hand free for handling the picked fruit.

It will be noticed that the bolts 14 are set outside of the center line of the cutting shear plate, so as to permit the shears to shut and clip fruit between them, when pressure is put against the shears. The pressure of the twig to which the fruit is connected thus assists in operating the shears.

I claim:

1. A device of the character specified, comprising a plate provided at one end with a socket for receiving a handle, and at the other end with oppositely extending lateral ears, a bar slidable on the plate toward and from the socket and provided at its outer end with oppositely arranged lateral ears, and with a longitudinal passage between the ears, means for guiding the bar, a spring normally pressing the bar outwardly and holding it with the ears extended beyond the plate, a pair of oppositely arranged substantially triangular blades, each blade being pivoted to the adjacent ear of the bar and having a concave cutting edge at its inner side, the said edges crossing each other at their inner ends and diverging from each other at their outer ends, a link pivotally connecting each blade to the adjacent ear of the plate, a cover plate secured to the first named plate and overlying the bar, the links and the inner edges of the blades, a hoop detachably connected with the plate, and a chute having one end connected with the hoop.

2. A device of the character specified, comprising a plate provided at one end with a socket for receiving a handle, and at the other end with oppositely extending lateral ears, a bar slidable on the plate toward and from the socket and provided at its outer end with oppositely arranged lateral ears, and with a longitudinal passage between the ears, means for guiding the bar, a spring normally pressing the bar outwardly and holding it with the ears extended beyond the plate, a pair of oppositely arranged substantially triangular blades, each blade being pivoted to the adjacent ear of the bar and having a concave cutting edge at its inner side, the said edges crossing each other at their inner ends and diverging from each other at their outer ends, a link pivotally connecting each blade to the adjacent ear of the plate, and a cover plate secured to the first named plate and overlying the bar, the links and the inner edges of the blade.

3. A device of the character specified, comprising a plate provided at one end with a socket for receiving a handle, and at the other end with oppositely extending lateral ears, a bar slidable on the plate toward and from the socket and provided at its outer end with oppositely arranged lateral ears, and with a longitudinal passage between the ears, means for guiding the bar, a spring normally pressing the bar outwardly and holding it with the ears extended beyond the plate, a pair of oppositely arranged substantially triangular blades, each blade being pivoted to the adjacent ear of the bar and having a concave cutting edge at its inner side, the said edges crossing each other at their inner ends and diverging from each other at their outer ends, and a link pivotally connecting each blade to the adjacent ear of the plate.

4. A device of the character specified, comprising a plate provided at one end with a socket for receiving a handle and at the other with oppositely extending lateral ears, a bar slidable longitudinally of the plate and having oppositely extending lateral ears at its outer end and a longitudinal recess between the ears, means for guiding the bar, a spring normally holding the bar with the ears extended beyond the plate, a substantially triangular blade pivoted to each of the ears, the adjacent sides of the blades being sharpened and overlapping at their inner ends and being spaced apart at their outer ends, said adjacent sides being concave longitudinally, a link pivotally connecting the outer corner of each blade with the adjacent ear of the plate, and a chute supported below the said blades.

5. A device of the character specified, comprising a plate provided at one end with a socket for receiving a handle and at the other with oppositely extending lateral ears, a bar slidable longitudinally of the plate and having oppositely extending lateral ears at its outer end and a longitudinal recess between the ears, a cutting blade pivoted intermediate the ends of its cutting edge to each ear of the bar, a link connecting each blade with the adjacent ear of the plate and holding the said blade with the cutting edge in inclined position, said edges overlapping at their inner ends and diverging at their outer ends, and a spring normally holding the bar with the ears extended beyond the plate.

6. A device of the character specified, comprising a support provided at one end with means for receiving a handle and at the other with oppositely extending lateral ears, a bar slidable longitudinally of the support, said bar having oppositely arranged lateral ears at its outer end, a spring normally pressing the bar outwardly, means for limiting the outward movement of the bar, a blade having a cutting edge pivoted to each ear of the bar intermediate the ends of the cutting edge, and a link connecting each blade to the adjacent ear of the support and holding the blades with their cutting edges inclined and crossing at their inner ends.

CHARLES H. BAKER.

Witnesses:
 FRED I. LYON,
 J. B. YOUNG.

Copies of this patent may be obtained for five cents each, by addressing the "Commissioner of Patents, Washington, D. C."